United States Patent [19]

Blum

[11] Patent Number: 4,663,678

[45] Date of Patent: May 5, 1987

[54] SYSTEM FOR WRITING AND READING DIGITAL DATA INTERSPERSED WITH ANALOG AUDIO FREQUENCY DATA ON MAGNETIC RECORDING TAPE

[75] Inventor: Victor Blum, Tel Aviv, Israel

[73] Assignee: Odetics, Inc., Anaheim, Calif.

[21] Appl. No.: 621,993

[22] Filed: Jun. 18, 1984

[51] Int. Cl.⁴ .................... G11B 27/38; G11B 15/18; G11B 27/19

[52] U.S. Cl. .................... 360/72.2; 360/27; 360/44; 360/49; 360/14.3; 379/73

[58] Field of Search .......... 360/14.3, 49, 72.2, 360/72.1, 74.4, 18, 27, 40, 44, 48, 51, 71, 8, 73, 74.1; 179/6.01, 6.07, 6.13

[56] References Cited

U.S. PATENT DOCUMENTS

| | | | |
|---|---|---|---|
| 3,387,293 | 6/1968 | Stockebrand | 360/49 X |
| 4,120,006 | 10/1978 | Nagami et al. | 360/72.2 |
| 4,134,130 | 1/1979 | Tachi | 360/14.3 X |
| 4,139,870 | 2/1979 | Tachi | 360/72.2 X |
| 4,210,785 | 7/1980 | Huber et al. | 360/72.2 X |
| 4,237,498 | 12/1980 | van Eijck et al. | 360/72.2 |
| 4,321,632 | 3/1982 | Leis et al. | 360/72.2 X |
| 4,377,825 | 3/1983 | Kasubuchi et al. | 360/72.2 X |
| 4,384,308 | 5/1983 | Yanagida | 360/72.2 X |
| 4,422,111 | 12/1983 | Moeller et al. | 360/72.1 |
| 4,473,851 | 9/1984 | Nagura et al. | |

OTHER PUBLICATIONS

Electronics, 11/21/58, "Tones Find Data in High-Speed Tape Systems" Wasserman et al., pp. 93–95.
EDN, 5/5/78, "Standard 3M Recording Techniques Could Spur Low-Cost μC Use" Kramer pp. 75–81.

Primary Examiner—Raymond F. Cardillo
Assistant Examiner—Steven R. Garland
Attorney, Agent, or Firm—Spensley Horn Jubas & Lubitz

[57] ABSTRACT

A recording system is provided in which digital time code information is recorded interspersed on the same data track as analog audio message signals. The time codes have a unique format which enables their bit rate to be extracted while reading the code, thus enabling use of the system with tape transports having unregulated fast wind speeds. The system is placed in a fast wind mode of operation and time codes are read and compared to a preselected time code in order to locate a desired audio message for playback. The configuration of the system ensures that the playback of each message will commence only at the beginning of a message. In addition, the invention eliminates the need for a separate data track for time codes, thus increasing the signal to noise ratio of the system.

10 Claims, 8 Drawing Figures

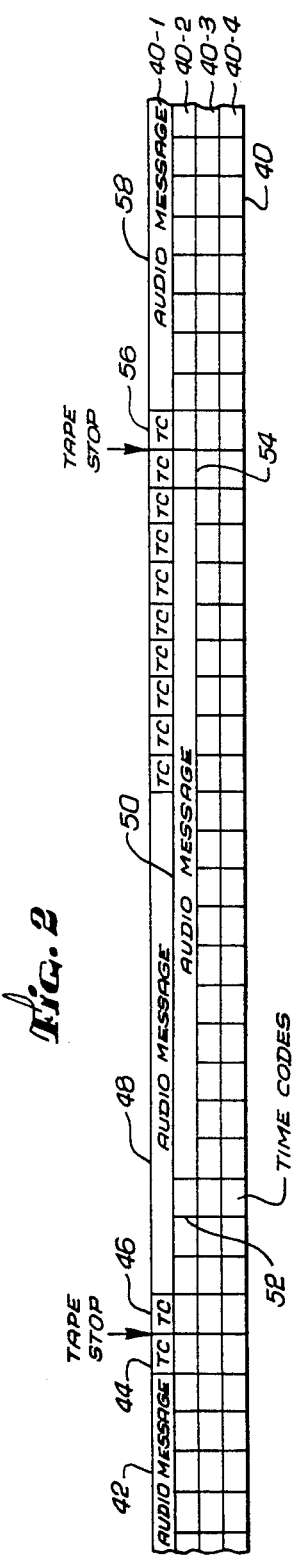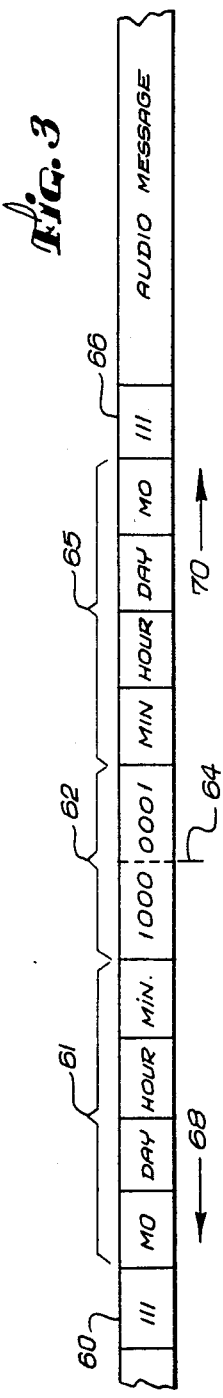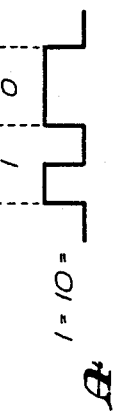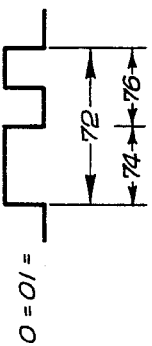

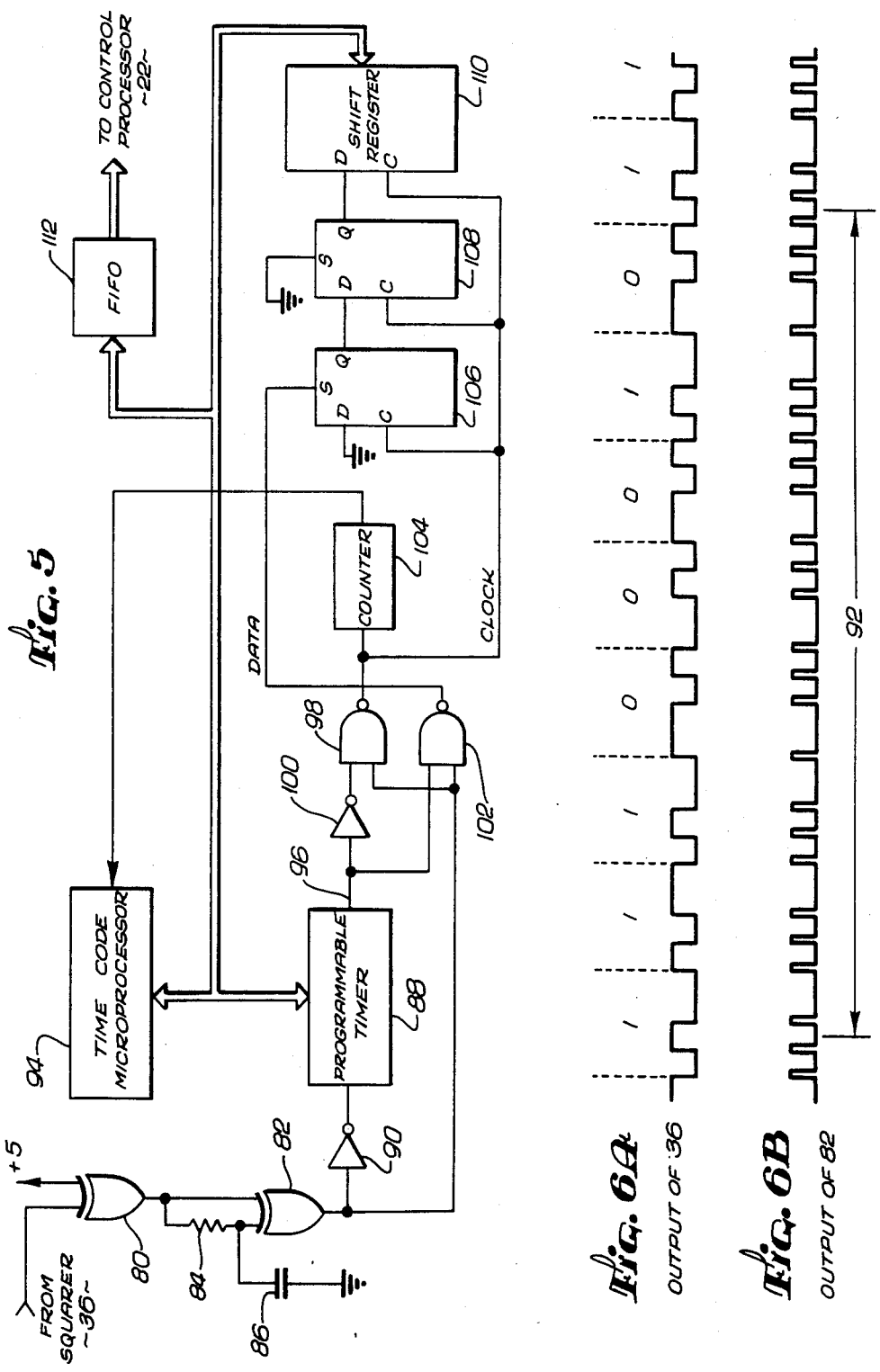

SYSTEM FOR WRITING AND READING DIGITAL DATA INTERSPERSED WITH ANALOG AUDIO FREQUENCY DATA ON MAGNETIC RECORDING TAPE

BACKGROUND OF THE INVENTION

1. Field of the Invention

The present invention relates to recording systems and more particularly to tape recording systems which record sporadically received messages. Still more particularly, the present invention relates to multitrack tape systems which can simultaneously record a plurality of audio messages and which includes means for logging the audio messages for later retrieval and playback.

2. Description of the Prior Art

Multitrack tape recording systems which can simultaneously record a number of audio messages such as telephone messages are well known in the art. Such systems are typically used in environments in which a record is kept of telephone calls received and multiple calls may be received at the same time, such as police departments or fire departments. Typically, the operator who receives the messages will mark down the time at which each message is received in order to have a record of all calls. In order to playback a message, it is desirable to have some means of conveniently locating the desired message from among all of the recorded messages.

Recording systems of the type described above may employ standard audio cassettes as the recording medium. In prior art systems, digital codes indicating the time are continuously recorded on a data track separate from the tracks upon which the audio messages are recorded. When it is desired to play a message which was recorded at a particular time, the digital code corresponding to that time is searched for while the tape is moved at high speed. Once the selected digital code is located, the tape is stopped and the corresponding message played back. A primary disadvantage of such a system is that it requires an extra data track on the tape, thus reducing the width of each data track and reducing the signal to noise ratio of the system.

Another disadvantage of prior art systems in which a time code is continuously recorded is that a portion of the message may not be played back if the time which was logged for the receipt of the call was incorrect. For example, assume the message was recorded beginning in the minute of 12:55 and ending in the minute of 12:59. Assuming that the handwritten log generated in conjunction with the logging system designated the message start time at 12:56, the search would locate the digital code corresponding to 12:56 and begin playing the tape at that point. Thus, several seconds of the message will not be played.

Typically, a tape system is run in a high speed fast forward or rewind mode when searching for a previously recorded message. In order to achieve the fastest winding time, the drive motors for the tape spools are driven at their maximum possible rate. As the tape winds from one hub to another, the linear tape speed with respect to the magnetic heads of the system will vary. In order to accurately read the digital time code from the tape, the data rate of the time code must therefore be determined. Prior art systems have included very elaborate means for determining the data rate of the digital codes in variable speed systems.

SUMMARY OF THE INVENTION

The present invention overcomes many problems of prior art systems by recording time codes interspersed on the same track as the audio messages. The need for a separate time code track is eliminated, thus substantially improving the signal to noise ratio of the system. In addition, the searching capabilities of the system are improved in that the system will locate a time code only at the beginning of a message, thus eliminating the possibility that a portion of the message will not be played back.

In order to facilitate simplified time code searching in either fast forward or rewind directions, a time code format is employed which is palindromic, i.e., identical whether it is read in the forward or reverse direction. The time code format is also used advantageously to enable the digital time codes to be read despite speed variations in the tape. An initial portion of each time code is monitored in order to determine the data rate of that time code. Clock signals for controlling the reading of the time code are then generated and are used to control the reading of a second portion of the time code which contains the desired time information.

The time code reading is controlled by means of a microprocessor which continuously monitors the format of the signals being read to determine if they represent time code or audio message information. Valid time codes are compared to a time code corresponding to the desired message while the tape transport is in a fast wind mode in order to locate the desired audio message.

BRIEF DESCRIPTION OF THE DRAWINGS

The invention will be described with reference to the accompanying drawings, wherein:

FIG. 2 is a diagram illustrating the recording of time codes and audio messages on a multitrack recording tape;

FIG. 3 is a diagram illustrating the format of the time code of the present invention;

FIGS. 4A and 4B are diagrams indicating the bit format of the time code;

FIG. 5 is a block diagram of the time code reader portion of the present invention; and FIGS. 6A and 6B are timing diagrams illustrating the operation of the time code reader.

DETAILED DESCRIPTION OF THE DRAWINGS

Figure 1:
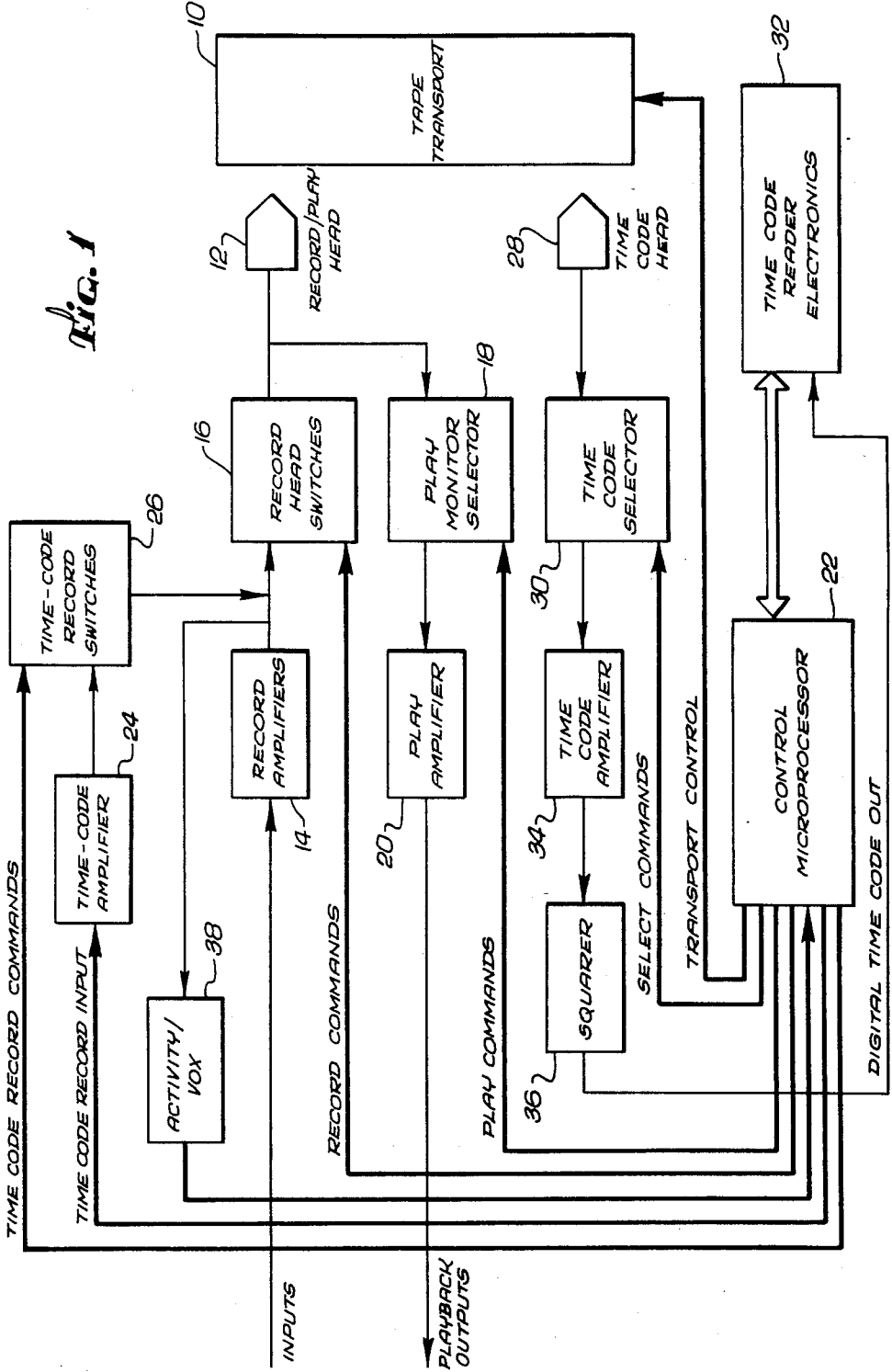
FIG. 1 is a block diagram of the recording system of the present invention.

The following description is of the best presently contemplated mode of carrying out the invention. This description is made for the purpose of illustrating the general principles of the invention and is not to be taken in a limiting sense. The scope of the invention is best determined by reference to the appended claims.

Referring to FIG. 1, the system of the present invention includes a tape transport 10 adapted for transporting magnetic tape between a pair of hubs (not shown). The tape transport mechanism is conventional and operates in a record/play constant speed mode and high speed fast forward and rewind modes. In the fast forward and rewind modes, the tape speed is not controlled but rather the drive motors which drive the hubs are driven at their maximum possible rate. In addition, as the tape is wound about a hub, its outside diameter increases, thus altering the linear speed of the tape. In the preferred embodiment of the invention, the tape is carried within a standard audio cassette.

The preferred embodiment of the system permits simultaneous recording on four separate channels. For purposes of clarity, only a single channel is indicated although it is to be understood that various components shown are duplicated for additional channels. Signals are recorded onto and played back from the tape by means of a record/play head 12. Audio messages to be recorded are provided at inputs and amplified by record amplifiers 14 and provided to the head 12 through record head switches 16. By operating selected ones of the switches 16, one or more messages may be simultaneously recorded on the tape. Playback of the messages is accomplished by actuating appropriate switches in a play monitor selector 18 to provide signals read by the head 12 to play amplifiers 20.

The record/play head 12 is also used to record digital time codes interspersed with the audio messages which are received. The digital time code is generated by a control microprocessor 22, amplified by a time code amplifier 24 and provided to the appropriate tracks of the head 12 by means of time code record switches 26. Recording of analog audio messages and digital time codes and playback of messages are all accomplished under the control of the microprocessor 22, as is control of the tape transport 10.

A separate magnetic head 28 is provided to read time codes from a previously recorded tape in order to locate a selected audio message. The tape transport is placed in the fast forward or rewind mode and the playback electronics are muted during a search operation. A time code selector 30 is actuated to select which track of the tape is to be searched. The output of the time code head 28 is delivered to a time code reader 32 via the time code selector 30, a time code amplifier 34 and a squarer 36. The time code reader electronics section operates in conjunction with the control microprocessor 22 to differentiate analog messages from digital time codes and to accurately read the digital time codes regardless of tape speed.

The basic operation of the invention will now be described. When a call is initially received, a signal from one of the record amplifiers 14 will activate a conventional activity/VOX device 38 (for voice activated recording) which will indicate to the control microprocessor that recording should begin. The microprocessor causes a time code to be recorded on the same track on which the audio message will be recorded. This function takes approximately one-eighth of a second. After the time code has been recorded, recording of the audio message is initiated. On the remaining tracks, the time code is continuously and repeatedly recorded as will be discussed subsequently. If an additional call comes in while the initial message is being recorded, it will be routed to a different amplifier 14 and the activity/VOX circuit for that channel will generate a signal to the microprocessor indicating that recording should be initiated on a second track of the tape. The microprocessor controls the time code record switches 26 to stop time code recording on the second track and initiate message recording. In a similar fashion, additional messages can be recorded on additional tracks as they are received. Whenever the recording of a message is completed and other messages are still being recorded, the microprocessor again causes time code signals to be recorded on that track. Thus, whenever the tape is moving, either time code or a message is being recorded on each track. Message recording is automatically controlled by the activity/VOX circuit 38.

If there is no analog message remaining to be recorded, the tape transport will be stopped until receipt of a subsequent message. Thus, the tape will be moving only when recording of a message is taking place on at least one track of the system. At all times during tape motion, either an analog message or a digital time code is being recorded on each track. Therefore, each track will have a plurality of audio messages interspersed with digital time codes. The digital time code just prior to each message is an indication of the time that recording of the message was initiated, and the digital code at the end of each message indicates the time of completion of the message.

In order to search for a particular message, the starting time and recorded track of the message, (both of which were previously manually logged) are entered into the control microprocessor 22. The microprocessor initiates high speed motion of the tape transport and the time code head 28 reads signals from the tape. Signals from the appropriate track are selected by the time code selector 30 and provided to the time code reader 32. The time code reader distinguishes between audio messages and digital codes and reads the digital codes and provides them to the control microprocessor 22 where they are compared to to the selected time code. When the desired time code is detected, the control microprocessor shifts the tape transport to the play mode, and playback through the head 12, selector 18 and amp 20 is commenced.

Unlike prior art systems, the present invention will always initiate playback at the beginning of the selected message, even if the time of the call is entered incorrectly. The microprocessor is programmed so that it searches for the selected time code, and if that time code is not located, it will search for the next earliest time code and begin playback at that point. Assume that a message was recorded beginning in the minute of 12:55 but that the handwritten log generated in conjunction with the logging system designated the message start time at 12:56. The code corresponding to 12:56 would thus be entered into the control microprocessor and the system would search for the corresponding digital code on the tape. However, since the analog message was being recorded during that time, no such code would appear on the selected track of the tape. The control microprocessor is programed so that if the selected code is not located, the search continues until the next lowest recorded time code is located. Thus, the search would stop with the detection of a time code indicating 12:55. Thus, the desired message is located and playback will only occur at the beginning of the message. This is in direct contrast to prior art systems in which playback may mistakenly be initiated in the middle of the message. With the present system, the beginning of the desired message is easily located on the first attempt.

The interspersed message and time code format recorded on the tape is illustrated in FIG. 2. A segment of tape 40 includes four tracks 40-1 to 40-4. At the completion of recording of an audio message 42 on track 40-1, a time code 44 is recorded and the tape stopped. When a subsequent message is to be recorded, the tape is started, a time code 46 recorded and recording of an audio message 48 initiated immediately thereafter. During the recording of this message, time codes are continuously recorded on tracks 40-2, 40-3 and 40-4. The time code is updated once per minute and is recorded approximately eight times per second. During the recording of the audio message 48, a second message 50 may be received. The recording of time codes on the track 40-2 is stopped and the recording of the message 50 is initiated. This message is recorded simultaneously with the message 48. As a result of the continuous recording of the time codes, a time code 52 is recorded which provides an accurate indication of the time of the beginning of the audio message 50.

At the end of the message 48, recording of time codes is resumed on track 40-1. However, the transport will continue to drive the tape, since the message 50 is still being recorded on track 40-2. At the completion of the message 50, a single time code 54 will be recorded and the tape stopped. When a subsequent message is received, tape movement will be begun, a time code 56 recorded and the audio message 58 recorded immediately thereafter on track 40-1.

The system of the present invention can simultaneously record up to four messages, with a time code being recorded on the corresponding track immediately prior to each message. Thus, by continuously recording time codes on unused tracks during tape motion, any message whose recording is begun while another message is being recorded will have a time code recorded immediately prior to it. It should also be noted that the recording of time codes does not interfere with the beginning of a message, since it only takes one-eighth of a second to record an individual time code.

The time codes are recorded in a format which enables them to be read in either direction of tape motion. The time code format is illustrated in FIG. 3. The time code is palindromic, i.e., it reads the same in both directions. The time code begins with a "preamble" 60 which in the present embodiment of the invention is comprised of three digital ones, and is followed by time code data 61 representing the present month, day, hour and minute. This time code data is followed by a middle section 62 including a one followed by six consecutive zeros and an additional one. A line 64 represents the axis of symmetry of the overall time code. The time code data is rewritten in section 65 following the middle section 62, but is written in reverse order from the initial time code data 61, i.e., minute, hour, day and month. In addition, the data within each time section is written in reverse order from the previously written time code data. This second time data information is followed by a "postamble" 66 identical to the preamble 60.

Thus, the digital time code illustrated in FIG. 3 will read the same in both directions and will contain data indicating the present time twice. When a time code is being read, only the second occurring set of time code data 61 or 65 is read for purposes of comparing the time codes on the tape with the preselected time code. The first occurring portion of the time code up to the middle section 62 is monitored for the purpose of determining the bit rate of the time code, i.e., the present tape speed, in order to control the generation of clock signals for reading the time data in the second portion of the time code. The middle is then read to synchronize the time code reader. Thus, if the tape were moving in a rewind direction as indicated by an arrow 68 in FIG. 3, the preamble 60 and time code data 61 would be monitored to determine the bit rate of the overall time code and clock control signals would be generated to control the reading of the time code data contained in the section 65. Conversely, if the tape were moving in a direction as indicated by an arrow 70, the postamble 66 and time code data 65 would be monitored to determine the bit rate in order to generate clock signals to control the reading of the time code data in the section 61.

The purpose of the preamble 60, middle section 62 and postamble 66 is to provide a unique format for the control microprocessor 22 to look for in order to determine if a valid time code is being read. In this way, the system can differentiate between time code data and analog message data. The time code reader 32 is continuously monitoring the signal from the time code head 28 and generating a control clock based upon detected transitions between high and low levels. Thus, the time code reader 32 itself does not distinguish between audio message and digital time code data. The control microprocessor thus receives data which may represent valid time code data or which may have been generated based upon an analog message signal. The control microprocessor 22 looks for the unique format of the time code in order to determine if the data received by it represents an actual time code. Thus, the time code reader 32 determines the bit rate of the code during the sections 60 and 61 (or 66 and 65 for tape motion in the opposite direction), generates clock signals and begins reading the remainder of the time code and transferring data to the control microprocessor 22 under control of the clock signals. The microprocessor looks for the middle section 62, i.e., a one followed by six zeros followed by another one, as a synchronization point to begin to determine that it is reading a valid time code. The time code data 65 (or 61) is then compared to the preselected time code. If the time codes match, the tape is stopped and the system placed in the playback mode. If the time codes do not match, the searching operation continues.

During the searching operation, the time code reader 32 will also receive audio message signals and will generate a control clock signal based upon a number of transitions contained in an audio signal. The reader 32 will then read subsequent audio signals as if they were digital time code data. These signals will not be read by the control microprocessor 22 as valid time codes, however, since they will not exhibit 10 or 01 bit pairs and an ending with three 1-bits. The system will thus accurately read digital time codes and will discrimate between signals which represent valid time codes and those generated based upon analog audio signals.

In order for the bit rate of a time code being read to be accurately determined, there must be some method of detecting the passage of each bit. This is not possible with a standard binary code, since there is nothing within the code itself which can be monitored that occurs every bit. For example, a string of consecutive zeros or ones would result in a uniform level signal being recorded on to the tape and a consequent lack of ability to detect the passage of each bit. As a result, it would be impossible to determine the bit rate of the code by looking at the code itself.

The present invention employs a bit format in which each bit cell has a fixed number of transitions between high and low levels. This is accomplished by employing a bi-phase redundant bit cell format as illustrated in FIG. 4. Each bit cell 72 is divided into two bit portions 74 and 76. Each bit in the time code is defined by a two bit word, with a one being defined as a 10 and a zero being defined as 01. In the bi-phase code, a zero has a transition only at the end of its bit period 74 or 76 whereas a one has a transition in the middle of the bit period as well as at the end of the bit period. Thus, three transitions between high and low levels will occur within each bit cell 72 regardless of whether the bit is a one or a zero. Although the transitions will not occur at a constant frequency rate, their average frequency may be determined in order to determine the bit rate of a code as it passes the head. This is accomplished by counting a fixed number of the transitions in the code, measuring the amount of time for this count and then dividing the time period by the number of transitions in order to obtain the bit rate. The calculated bit rate is then used to control the generation of clock pulses which are used to control the reading of the code. It should be noted that the monitoring of transitions occurs within a time period that is less than one-half of the time periods 61 or 65, so that the clock signal generated just before the reading of the middle section 62 will be an accurate reflection of the bit rate of the time code (i.e., it will not be based upon any analog information signals).

FIG. 5 is a block diagram of the time code reader of the present invention. Initially, the time code signals (FIG. 6A) from the squarer 36 of FIG. 1 are converted to pulse signals by means of exclusive OR gates 80 and 82 and a delay network including resistor 84 and capacitor 86. The output of the gate 82 is a short positive pulse at every edge (transition) of the input signal from the squarer 36 as indicated in FIG. 6B. These pulses are applied to a programmable timer 88 through an inverter 90. The timer 88 counts a predetermined number of these pulses and provides an interrupt to a dedicated time code microprocessor 94. The microprocessor 94 measures the time transpiring during the pulses counted by the timer to determine the bit rate of the signal being read. This determination is updated continuously at a rate which is more than twice the frequency of the time code areas 61 and 65 (FIG. 3) to ensure that the clock rate determined before the reading of a valid time code is based only upon the reading of digital time code data. The calculated bit rate is used to set a one-shot within the timer 88 to provide read control clock pulses on line 96. The clock pulses provided thus are control signals generated as a function of the calculated bit rate of a time code being read.

The clock pulses are applied to a NAND gate 98 through an inverter 100 and directly to a NAND gate 102. The clock pulses are seventy-five percent of a bit cell in length in order to minimize noise problems. The gates 98 and 102 decode the edge pulse signals from the exclusive OR gate 82 into separate data (102) and clock (98) outputs. The clock output at 98 controls the operation of a counter 104, flip-flops 106 and 108 and a shift register 110. Data from the gate 102 is provided to the counter 104 and flip-flop 106. Counter 104 detects a sequence of six zero bits which indicate the middle section (a one followed by six zeros followed by a one). This counter interrupts the microprocessor 94 and starts the data reading sequence. The flip-flops 106 and 108 serve to decode the data into standard non-return-to-zero (NRZ) format for application to the shift register 110. The shift register 110 will thus accumulate a series of ones and zeros corresponding to the time code being read. Each time code bit is represented by a pair of bits in the shift register, i.e., the redundant bit format of FIG. 4 transformed to a NRZ format is loaded into the shift register 110. The shift register accumulates eight data bits from the flip-flop 108, shifting them in on every clock cycle, and then transfers them as a byte to the microprocessor 94 on command. The command is provided by means of the programmable timer 88 which keeps track of the shifting of data into the shift register and provides a signal to the time code microprocessor 94 when the shift register has received sufficient data. The microprocessor 94 examines the data for a valid format and either resets the process if it is not valid or accepts the byte and waits for another if it is valid. This examination includes examining the postamble 66 as well as looking for the redundant format of the time code. After seven sequential valid bytes have been accepted, the processor transfers them to a first-in-first-out memory (FIFO) 112, where they are available to the control processor 22. It should be noted that only half the bits are transferred to the FIFO 112, as the other bits are redundant.

The control microprocessor 22 examines the data from the FIFO 112 and compares it with the preselected time code which had been previously manually entered into the control processor. When the read time code agrees with the preselected time code, the control processor causes the transport to shift to the play mode of operation. Since an audio message may be recorded during the time of the preselected time code, the microprocessor is programmed to search for the time code which is equivalent to the preselected time code or the next earlier time code. The shift to the play operation will therefore occur precisely at the beginning of an analog message.

Thus, the present invention provides a system and method for writing and reading time code information on the same data tracks as analog audio messages, thereby eliminating the need for a separate time code data track. The time code reader of the present invention, in conjunction with the unique data format of the time codes, can read time codes regardless of the speed of motion of the tape, thus enabling the system to be used with recorders having unregulated fast speed operation. The code is recorded in a palindromic format to enable it to be read in either direction of tape motion, with an initial portion of the code in either direction being utilized to determine the bit rate of the code to thereafter enable the time code information to be accurately read.

What is claimed is:

1. A tape recording and playback system comprising:
   transport means for moving a recording tape having at least one track along a linear path at a substantially constant recording and playback speed and at a variable high speed in forward or reverse directions;
   recording means for recording (a) analog messages on the tape and (b) digital codes for use in locating the analog messages, wherein the digital codes are recorded on the same track as the analog messages, the recording means including means for generating a plurality of digital codes, each having a first section containing a plural bit identification code having a first bit sequence and a second section containing the same identification code as the first section but in an opposite bit sequence;
   code reading means for reading the digital codes from the tape in either direction of high speed tape motion, said code reading means including means for determining the bit rate of the digital code being read during the reading of whichever of the first and second section occurs first and for reading the identification code contained in whichever of the first and second section occurs second under control of the determined bit rate, whereby the bit sequence during the reading of the identification code will be the same regardless of the direction of tape motion, the code reading means further including means for discriminating between digital codes and analog messages; and playback means for playing back analog messages from the tape.

2. The system of claim 1 wherein the digital codes are defined by a plurality of bits in which each bit is defined by a multiple bit word having an equal number of transitions between high and low levels, wherein the code reading means includes means for a) determining the average rate of transitions occurring as the first occurring section of the digital code is read thereby to determine the bit rate of said code and b) generating clock signals as a function of the average rate of transitions to control the reading of the second occurring section of the digital code.

3. The system of claim 2 wherein the code reading means includes timer means for measuring the period of time transpiring during a predetermined number of transitions, calculating means for determining the bit rate of the digital code as a function of the measured period of time and generating means for generating said clock signals in response to the determined bit rate.

4. The system of claim 1 wherein the digital codes have a predetermined format, wherein the means for discriminating includes means for reading signals from the tape and forming a digital output from the read signals and determining if the digital signals fall within the predetermined format.

5. A system as in claim 1 wherein the recording means records a digital code prior to each analog message, wherein the digital code represents the time that the recording of the message was initiated.

6. A system as in claim 5 wherein the code recording means records a digital code at the completion of each audio message which represents the time of completion of the message.

7. A system as in claim 5 wherein the tape has a plurality of tracks and the recording means includes means for simultaneously recording different analog messages on different tracks, the system including control means for operating the recorder such that during the recording of a message on one track, the recording means continuously records digital time codes on the remaining tracks until additional analog messages are received, at which point the additional analog messages are recorded, whereby every recorded analog message has a digital time code recorded immediately prior its commencement.

8. A system as in claim 1 wherein each digital code further includes a middle section between the first and second section having a predetermined bit sequence which is the same in either direction of tape motion, wherein the code reading means reads the middle section after the bit rate has been determined to provide an indication of the start of the reading of the first or second section.

9. A system as in claim 8 wherein each digital code further includes additional code sections of predetermined bit sequence located to the outside of the first and second sections, said additional code sections being the same bit sequence for every digital code.

10. A tape playback system comprising:

transport means for moving a recording tape having at least one track along a linear path at a substantially constant playback speed and at a variable high speed in forward or reverse directions, wherein the tape includes recorded signals including (a) analog messages and (b) digital codes for use in locating the analog messages, wherein the digital codes are recorded on the same track as the analog messages, each digital code having a first section containing a plural bit identification code having a first bit sequence and a second section containing the same identification code as the first section but in an opposite bit sequence;

code reading means for reading the digital codes from the tape in either direction of high speed tape motion, said code reading means including means for determining the bit rate of the digital code being read during the reading of whichever of the first and second section occurs first and for reading the identification code contained in whichever of the first and second section occurs second under control of the determined bit rate, whereby the bit sequence during the reading of the identification code will be the same regardless of the direction of tape motion, the code reading means further including means for discriminating between digital codes and analog messages; and playback means for playing back analog messages from the tape.

* * * * *